Dec. 31, 1935.  F. M. BOYD  2,026,299
ELECTRICAL LIQUID LEVEL INDICATOR
Filed Oct. 3, 1933
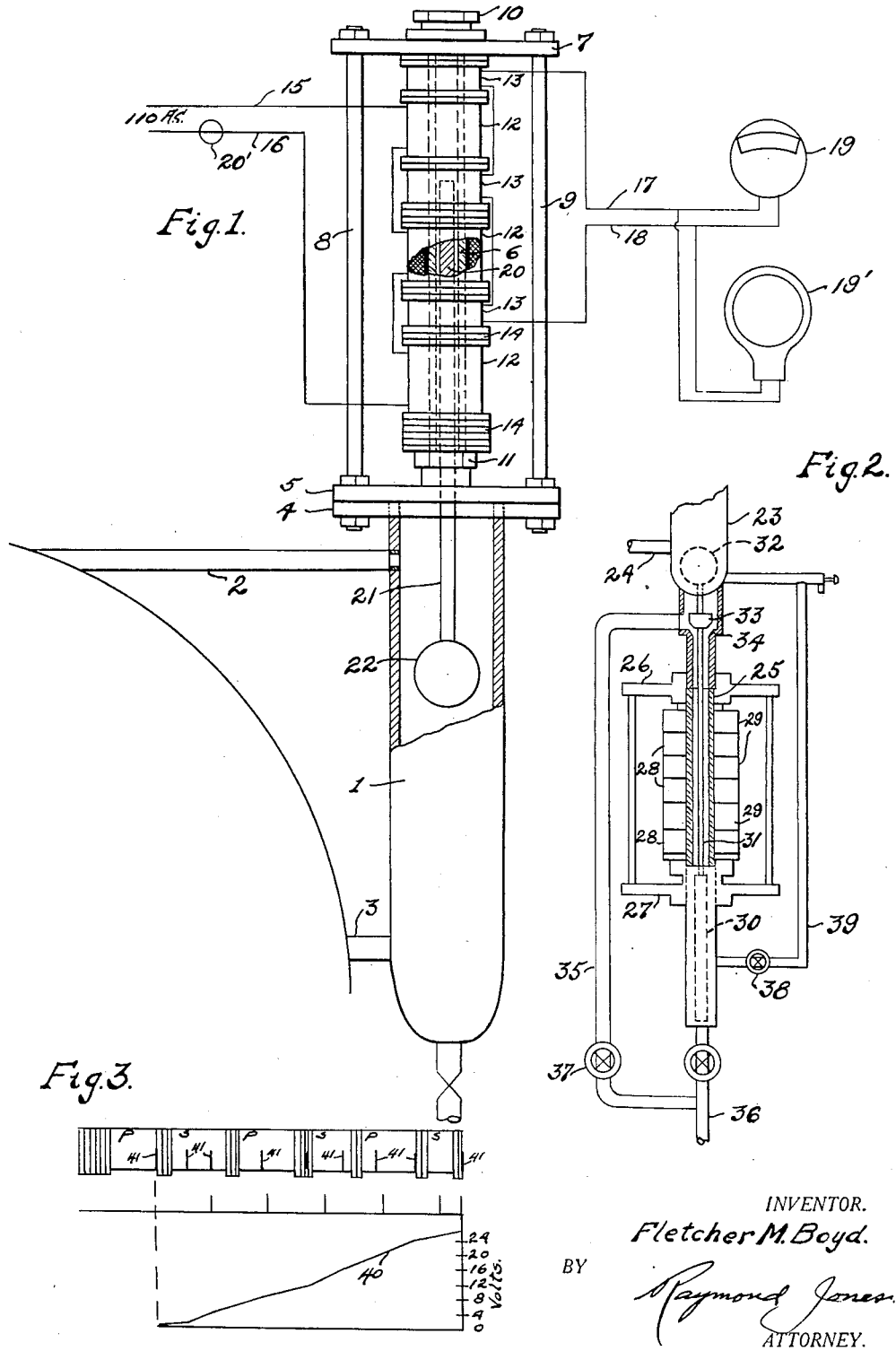
INVENTOR.
Fletcher M. Boyd.
BY
Raymond Jones.
ATTORNEY.

Patented Dec. 31, 1935

2,026,299

UNITED STATES PATENT OFFICE 2,026,299

ELECTRICAL LIQUID LEVEL INDICATOR

Fletcher M. Boyd, Knoxville, Tenn.

Application October 3, 1933, Serial No. 692,048

1 Claim. (Cl. 177—351)

My invention relates to an electrical liquid level indicator and has for its main object to provide, at a point remote from a fluid reservoir, an accurate visible indication of the liquid level within the reservoir.

Another object is to provide an electrical indicator of the inductive type wherein a plurality of mutually inductive coils cooperate with an induction adjusting element in a manner to produce a uniform variation of induction whereby to secure a maximum efficiency in operation and accuracy of indication.

Another object is to provide an indicator particularly adapted for boiler level indication which is simple though rugged in construction, as well as economical to manufacture.

According to the prior art devices of which I am aware, use has been made of various forms of either inductive or contact types of electrical indicators. The inductive types proposed were either the single coil type or the co-extensive, spaced, mutually inductive coil type. Both of these types present difficulties in construction and operation, and do not afford the high degree of accuracy demanded by the best practice.

According to my invention, I provide a series of alternately arranged primary and secondary coils which are aligned in a manner to be mutually inductive. The primary coils are connected to be energized in series. The secondary coils are likewise connected in series and are in a circuit including an indicator. In order to vary the electromotive force generated in the secondary coils, a magnetic core is arranged to be moved axially within all the coils and is varied in position in response to movement of a float which rises and falls with the water level in the boiler. With the primary and secondary coils arranged as disclosed, a substantially straight line graph of generated voltages is secured whereby the remote indicator employed is varied in direct proportion to variations in the water level.

In the accompanying drawing—

Figure 1 is a view in side elevation, partly sectional, showing a preferred form of level indicator;

Fig. 2 is a view in side elevation, partly sectional, of a modification; and

Fig. 3 shows a typical voltage curve.

Referring to the drawing in detail, a float chamber 1 is adapted to be supported upon a boiler or liquid reservoir by means of liquid inlet pipes 2 and 3. The chamber 1 may be screw threaded into a supporting plate 4 which, in turn, is secured to a gauge tube supporting plate 5. A gauge tube 6, formed preferably of porcelain, is supported at its lower end within an opening formed in the plate 5 and at its upper end within an opening formed in a plate 7. The plates 5 and 6 are held rigidly in spaced relation by means of rods 8 and 9. The ends of the gauge tube are sealed fluid tight in the usual manner by means of stuffing boxes 10 and 11.

A series of spaced primary coils 12 are supported directly on and in close relation to the gauge tube 6. A series of secondary coils 13 are similarly supported within the spaces between the primary coils whereby the primary and secondary coils alternate in alignment. I prefer to employ six coils and place a secondary coil at the top of the coil stack, with these coils alternating in the order—secondary—primary—which arrangement permits a primary coil to be located at the bottom of the coil stack. The adjacent coils are spaced a desired distance by means of insulating disks 14.

The three primary coils are connected in series and are energized from conductors 15, 16 leading from a 110 volt A. C. source. The secondary coils are also connected in series and their free terminals 17, 18 are connected to an indicator 19 of the volt-meter type. A magnetic core 20 is positioned within the gauge tube and is connected by a rod 21 to a ball float 22 within the chamber 1. If desired, a recording voltmeter or indicator 19' may also be connected to the lines 17, 18. A signal or test lamp 20' may be placed in circuit with the supply lines.

In the modification according to Fig. 2, a water column 23 may be secured to a boiler by inlet pipes 24 as in Fig. 1. A porcelain gauge tube 25 is supported between plates 26 and 27 which are suspended from and below the column 23. Primary and secondary coils 28 and 29, respectively, are mounted on the tube 25 and connected in circuits in a manner as shown in Fig. 1. A core 30 is suspended by a bronze rod 31 from the ball float 32. A check valve 33 is mounted on the rod 31 and in its lowered position is arranged to cover a valve seat 34. A rising water level in column 23 will cause the core 30 to be drawn upwardly within the coils 28 and 29. A water column blow off pipe 35 is arranged to blow off at 36 when the valve 37 is opened. In the event that a tube 25 should break, the ball 32 will fall and the valve 33 will close. The broken tube will be replaced with a new tube and a valve 38 in the equalizer pipe 39, when opened, will permit equal fluid pressure to act on both sides of the valve 33, whereupon the ball 32 may rise and fall in normal operation. A great advantage of suspending the coils below the water column is that they are subjected to much less heating effect of dry steam temperature of about 390 degrees F. as would be in the arrangement shown in Fig. 1.

In operation, variations in liquid level in the chamber 1 will cause the core 20 to assume various positions within the coil assembly. As the core moves from the bottom to the top of the coils, the magnetic flux mutually threading through the adjacent primary and secondary coils is gradually and uniformly increased in a manner to uniformly increase the voltage generated in the secondary series. This voltage is impressed upon the indicator 19, the scale of which may be calibrated in feet and inches of level in the boiler or liquid tank. Fig. 3 shows a scale of voltages actually produced by test of a device constructed according to Figs. 1 and 2. Numeral 40 indicates a scale of voltages produced in the secondary with the core 20 placed at various positions 41 with respect to the coils P—S. By spacing the coils according to the number of spacers 14 inserted, I have succeeded in producing a substantially uniform increase in voltage from zero to 24 volts in proportion to the upward movement of the core 20 within the coils.

While I have shown and described preferred forms of my invention for the purpose of disclosing the principle thereof, it is to be understood that other modifications and equivalents thereof are contemplated as will be embraced within the scope of the appended claim.

What I claim is:

A liquid level indicator comprising a non-magnetic tube, a magnetic core slidably arranged within said tube, a float movable in response to variations in liquid level and being secured to said core, a series of spaced primary coils surrounding said tube, a series of spaced secondary coils surrounding said tube, said primary and secondary coils being alternately arranged and relatively positioned in adjacent pairs in mutually inductive relation coaxially around the tube, means for energizing said primary coils in series, an electrical voltage indicator, said secondary coils being connected in series and in circuit with said indicator, said core being sufficient in length to extend through all said coils.

FLETCHER M. BOYD.